United States Patent [19]

Leistra et al.

[11] Patent Number: 5,782,537
[45] Date of Patent: Jul. 21, 1998

[54] AUTOMOTIVE SEAT BACK

[75] Inventors: Philip Leistra, Novi; James Masters, Farmington; Andrew Massara, Southfield; Rich Sanders, Clarkston; Steve Lambrecht, Warren, all of Mich.

[73] Assignee: Lear Corporation, Southfield, Mich.

[21] Appl. No.: 705,420

[22] Filed: Aug. 29, 1996

[51] Int. Cl.⁶ .................... A62B 35/00; B60R 21/00
[52] U.S. Cl. .................. 297/473; 297/483; 297/216.13; 297/452.18; 297/452.65
[58] Field of Search ............... 297/452.18, 452.2, 297/452.65, 483, 216.13, 473

[56] References Cited

U.S. PATENT DOCUMENTS

| Re. 34,051 | 9/1992 | Deegener et al. | 297/468 |
|---|---|---|---|
| 3,471,197 | 10/1969 | Ely | 297/483 |
| 3,663,057 | 5/1972 | Lohr et al. | 297/483 X |
| 4,015,878 | 4/1977 | Perkins . | |
| 4,076,306 | 2/1978 | Satzinger | 297/216.13 |
| 4,431,233 | 2/1984 | Ernst | 297/483 X |
| 4,652,053 | 3/1987 | Mikami | 297/483 X |
| 4,718,696 | 1/1988 | Koide et al. | 297/483 X |
| 4,749,231 | 6/1988 | Cremer et al. | 297/483 X |
| 4,804,226 | 2/1989 | Schmale | 297/483 X |
| 5,022,677 | 6/1991 | Barbiero | 297/483 X |
| 5,055,824 | 10/1991 | Hamaue | 297/468 |
| 5,088,794 | 2/1992 | Iwami et al. | 297/283 |
| 5,123,673 | 6/1992 | Tame | 297/468 X |
| 5,219,202 | 6/1993 | Rink et al. | 297/216.13 |
| 5,246,271 | 9/1993 | Boisset | 297/483 X |
| 5,310,247 | 5/1994 | Fujimori et al. | 297/452.18 X |
| 5,328,341 | 7/1994 | Griswold et al. | 297/452.18 X |
| 5,362,132 | 11/1994 | Griswold et al. | 297/483 |
| 5,364,170 | 11/1994 | West | 297/483 |
| 5,390,982 | 2/1995 | Johnson et al. | 297/483 X |
| 5,411,319 | 5/1995 | Kuiri | 297/483 |
| 5,441,332 | 8/1995 | Verellen | 297/483 |
| 5,447,360 | 9/1995 | Hewko et al. | 297/452.18 |
| 5,452,941 | 9/1995 | Halse et al. | 297/483 X |
| 5,468,050 | 11/1995 | Hall et al. | 297/452.18 X |
| 5,468,053 | 11/1995 | Thompson et al. | 297/452.18 X |
| 5,599,070 | 2/1997 | Pham et al. | 297/483 |

Primary Examiner—Jose V. Chen
Assistant Examiner—Rodney B. White
Attorney, Agent, or Firm—Howard & Howard

[57] ABSTRACT

An automotive seat back (34) which comprises a pair of spaced upright members (40) each having lower ends rotatably supported on pivot pins (38) and interconnected by a cross member (42) extending between the upper ends. A shoulder belt housing (44) extends upwardly between the upright members (40) from below the cross member (42) to a distal end (46) disposed above and outside the cross member (42). Crisscrossing truss elements (52) interconnect the upright members (40) and the housing (44) to suspend the housing (44) within the periphery of the seat back as defined by the upright members (40) and the cross member (42). The upright members (40) and the cross member (42) and the truss elements (52) and the housing (44) are all integrally die cast of magnesium. The housing (44) includes a coffin portion, defined by side walls (54) and a bottom (56), and a cover (58) disposed over and in sealing engagement with the side walls (54). The cover (58) of the housing (44) includes a guideway (62) for a shoulder belt (50). To accommodate the angled exit of the belt (50) from the angled belt opening (48), the guideway (62) has a compound curve to prevent the edges of the shoulder belt (50) from gathering.

13 Claims, 3 Drawing Sheets

AUTOMOTIVE SEAT BACK

RELATED APPLICATION

This application claims priority to and all of the benefits of co-pending U.S. provisional patent application Ser. No. 60/007,548 which was filed on Nov. 27, 1995 and is entitled "Modular Vehicle Seat Assembly." This application also claims priority to and all the benefits of co-pending U.S. provisional patent application Ser. No. 60/016,775 which was filed on May 7, 1996 and is entitled "Improved Modular Vehicle Seat Assembly".

TECHNICAL FIELD

The subject invention relates to automotive seat assemblies and, more specifically, to the seat back of a seat assembly.

BACKGROUND OF THE INVENTION

To improve both the comfort and performance of seat belt restraint systems, seat assemblies are being developed which have the belt restraint system mounted to the seat rather than to the vehicle body. This improves comfort and performance of the restraint system by maintaining the belt anchor points in fixed positions relative to the seat occupant, regardless of the adjusted position of the seat within the vehicle body.

When the seat belt restraint system is mounted to a seat as opposed to being mounted directly to the vehicle body adjacent the seat, it is necessary for the shoulder belt to be packaged within the seat back. Examples of such systems are disclosed in U.S. Pat. Nos.: 3,663,057 to Lohr et al; 4,431,233 to Ernst; 4,749,231 to Cremer et al; 4,804,226 to Schmale; 5,452,941 to Halse et al; and 5,468,053 to Thompson et al. The packaging of the shoulder belt assembly in the seat back must coordinate with the trim components placed upon the seat back for aesthetic purposes and for the comfort of the occupant. There is also a need for a seat back which accommodates various different trim components independently of the shoulder belt restraint system.

SUMMARY OF THE INVENTION AND ADVANTAGES

An automotive seat back assembly comprising a pair of spaced upright members each having lower ends and upper ends and a cross member extending between the upper ends with mounting means at the lower ends for mounting to a seat frame. A shoulder belt housing extends upwardly between the upright members from below the cross member to a distal end disposed above the cross member.

Accordingly, the subject invention provides a seat back which is universally used with various different trim components and includes a shoulder belt restraint system which is independent of the various different trim components.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
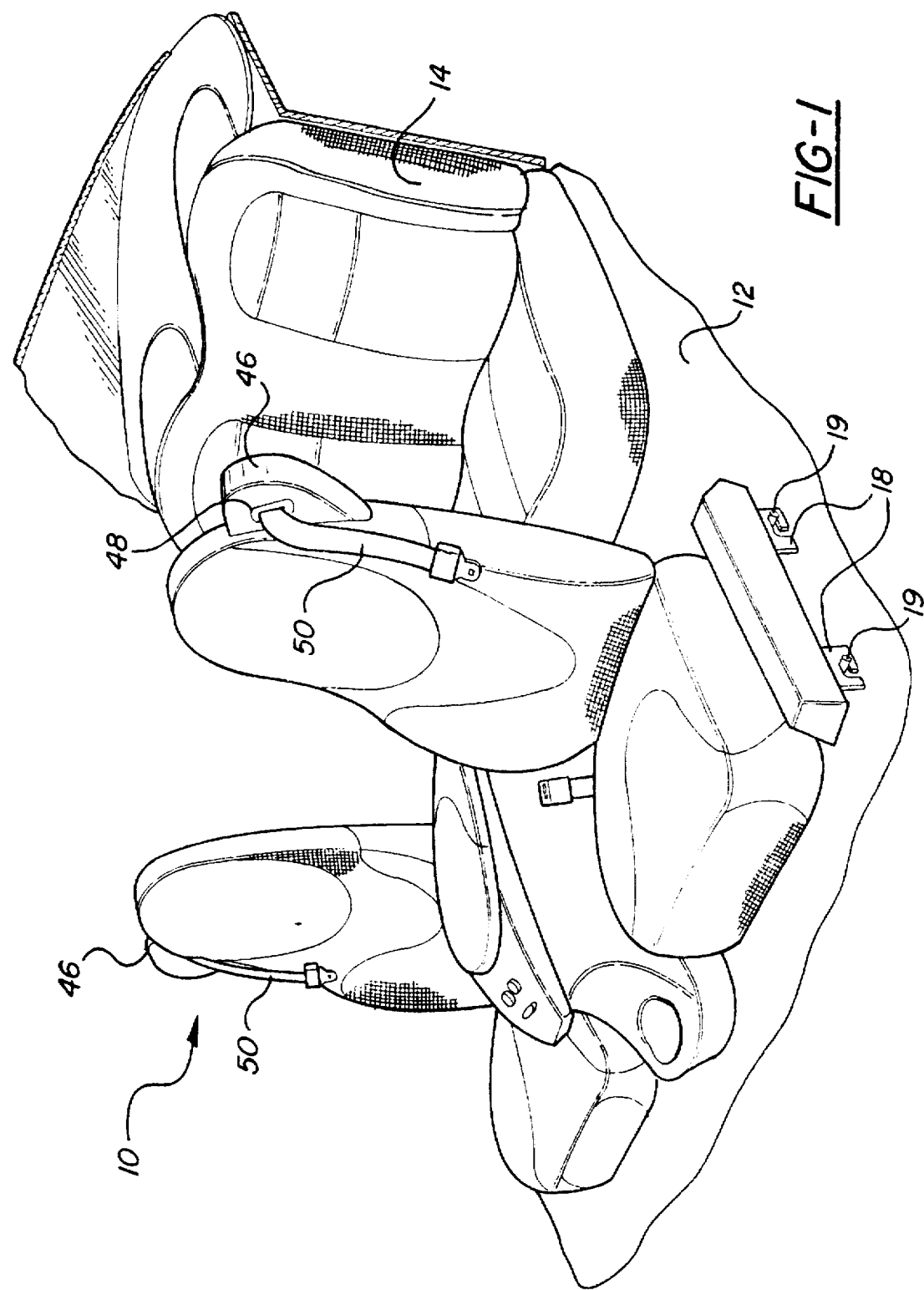
FIG. 1 is a perspective view of the interior of a vehicle showing a front seat assembly employing the subject invention.
Figure 2:
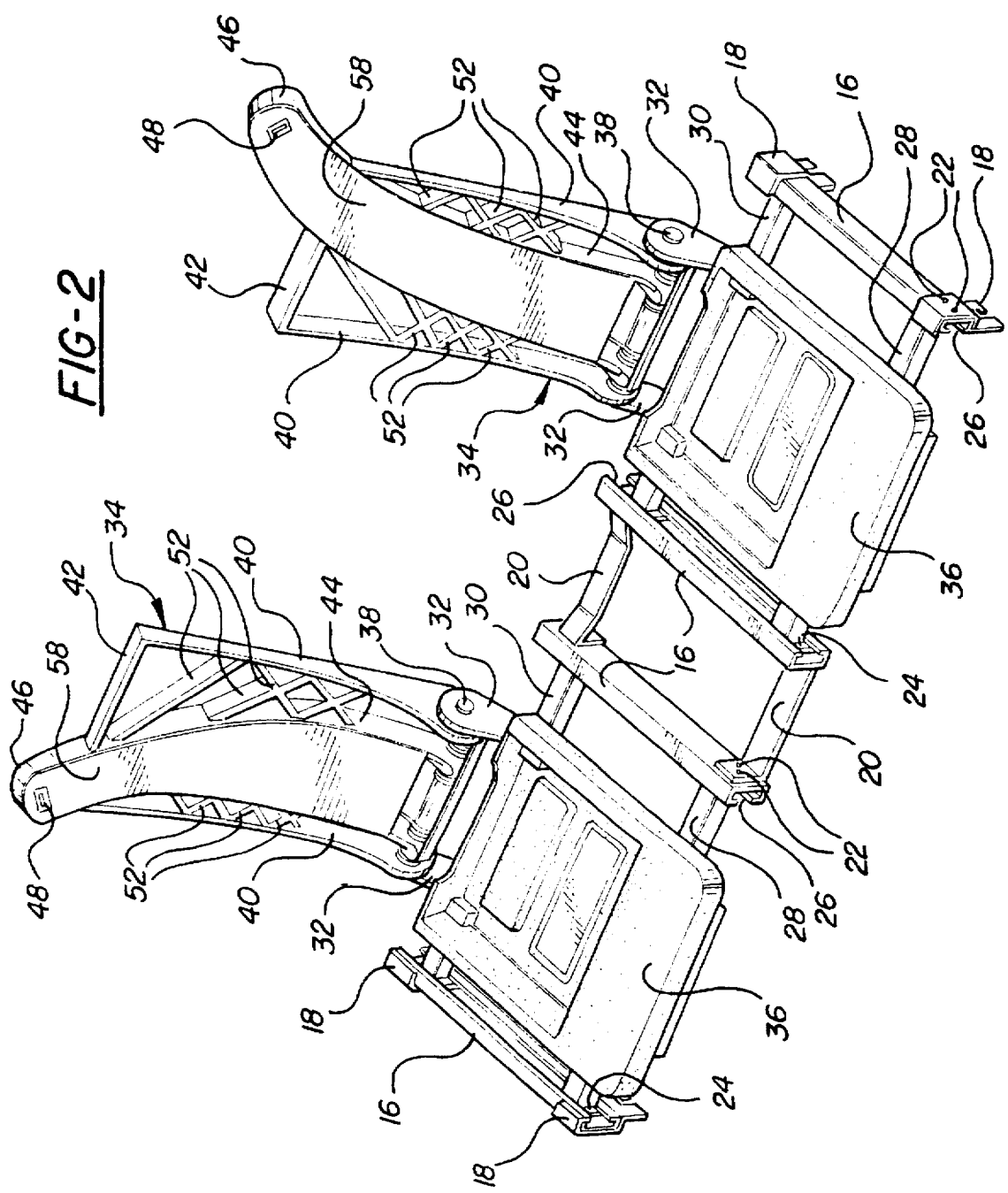
FIG. 2 is a perspective view of the support components of the front seat assembly employing the subject invention.

Referring to the Figures, wherein like numerals indicate like or corresponding parts throughout the several views, a front seat assembly is generally shown at 10. The assembly 10 is to be installed as a unit in a vehicle 12 in front of a rear seat assembly 14.

The seat assembly 10 comprises two seats with each including a pair of fixed rails 16 extending fore and aft and being laterally spaced across the vehicle 12 from one another. A plurality of brackets 18 and 20 are attached by rivets 22, spot welds, or the equivalent, to the fixed rails 16 for attachment to the vehicle 12. Preferably, the brackets 18 include L-shaped slots which latch onto hooks 19 which extend from the vehicle 12. A slide rail 24 is supported by each of the fixed rails 16 for fore and aft movement relative to the fixed rails 16. The fixed rails 16 comprise C-shaped channels having openings 26 which face one another and the slide rails 24 are slidably disposed in the C-shaped channels defining the fixed rails 16. Although not shown, roller or ball bearings may support the slide rails 24 in the fixed rails 16.

A pair of front 28 and rear 30 cross beams interconnect the slide rails 24 for supporting all of the remaining components of a first seat supported totally on the cross beams 28 and 30. The cross beams 28 and 30 extend through the openings 26 in the C-shaped channels defining the fixed rails 16 with the ends thereof attached to the slide rails 24, which are disposed inside the C-shaped channels. A seat support pan 36 is supported on the cross beams 28 and 30. The specifics of the seat pan 36 and the underlying framework form the subject matter of an independent invention disclosed and claimed in co-pending application Ser. No. 08/705,513 filed concurrently herewith and assigned to the assignee hereof.

A pair of seat back flanges 32 support a seat back, generally indicated at 34. The rear cross beam 30 has an irregular cross section, and each of the seat back flanges 32 has an irregular or triangular opening complementary to and surrounding the rear cross beam 30 for supporting the seat back 34 on the rear cross beam 30. Appropriate pivot pins 38 interconnect the seat back 34 and the flanges 32 for reclining movement of the seat back 34. The specifics of the reclining mechanism for the seat back 34 form the subject matter of an independent invention disclosed and claimed in co-pending application Ser. No. 08/705,422 filed concurrently herewith and assigned to the assignee hereof.

The subject invention is directed to the automotive seat back 34 which comprises a pair of spaced upright members 40 each having lower ends rotatably supported on the pivot pins 38. In other words, the pivot pins 38 define mounting means at the lower ends of the upright members 40 for mounting the seat back 34 to the flanges 32 of the seat frame. The upright members 40 have upper ends interconnected by a cross member 42 extending between the upper ends.

A shoulder belt housing 44 extends upwardly between the upright members 40 from below the cross member 42 to a distal end 46 disposed above the cross member 42. The shoulder belt housing 44 defines a belt opening 48 for guiding a shoulder belt 50.

The opening 48 is disposed vertically above one of the upright members 40 for positioning the shoulder belt 50 over the shoulder of an occupant. As shown, the belt opening 48 is positioned outside the area between the upright members 40.

The seat back 34 includes crisscrossing truss elements 52 interconnecting the upright members 40 and the housing 44. The truss elements 52 suspend the housing 44 within the periphery of the seat back as defined by the upright members 40 and the cross member 42. Preferably, the upright members 40 and the cross member 42 and the truss elements 52 and the housing 44 are all integrally formed of a homogeneous material, such as being die cast of magnesium.

Figure 3:
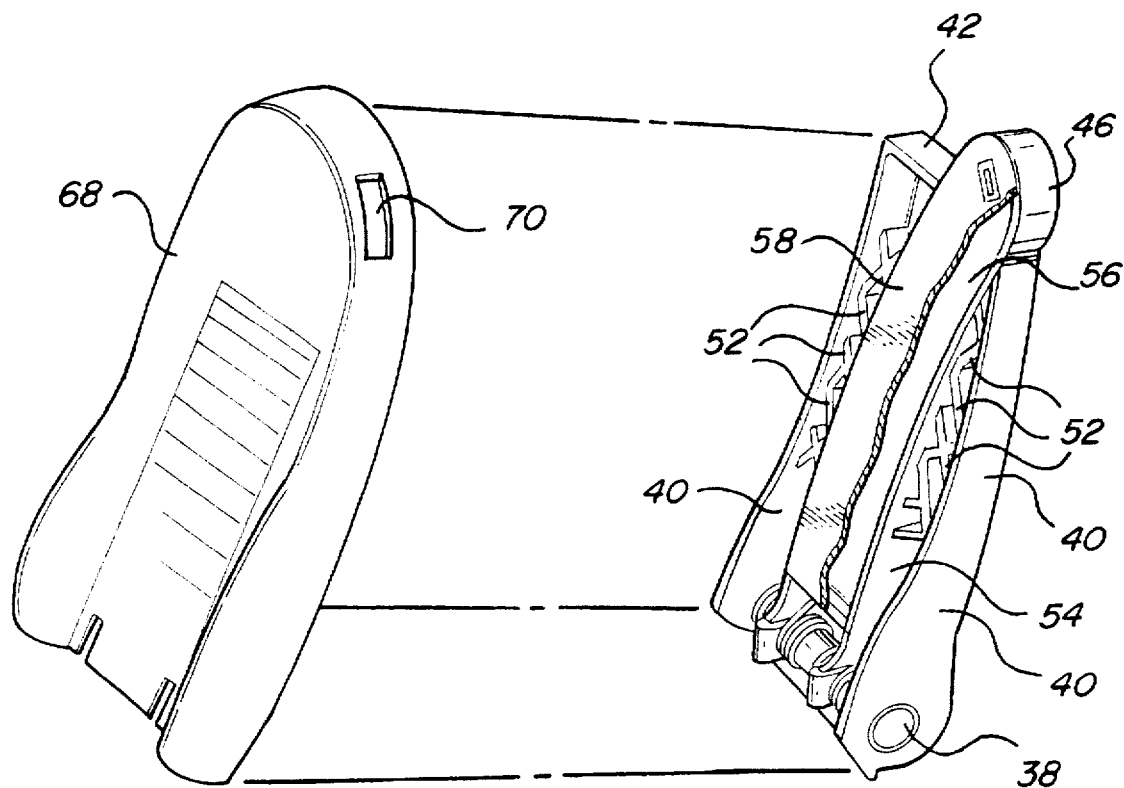
FIG. 3 is an exploded perspective view of the seat back of the subject invention.
Figure 4:
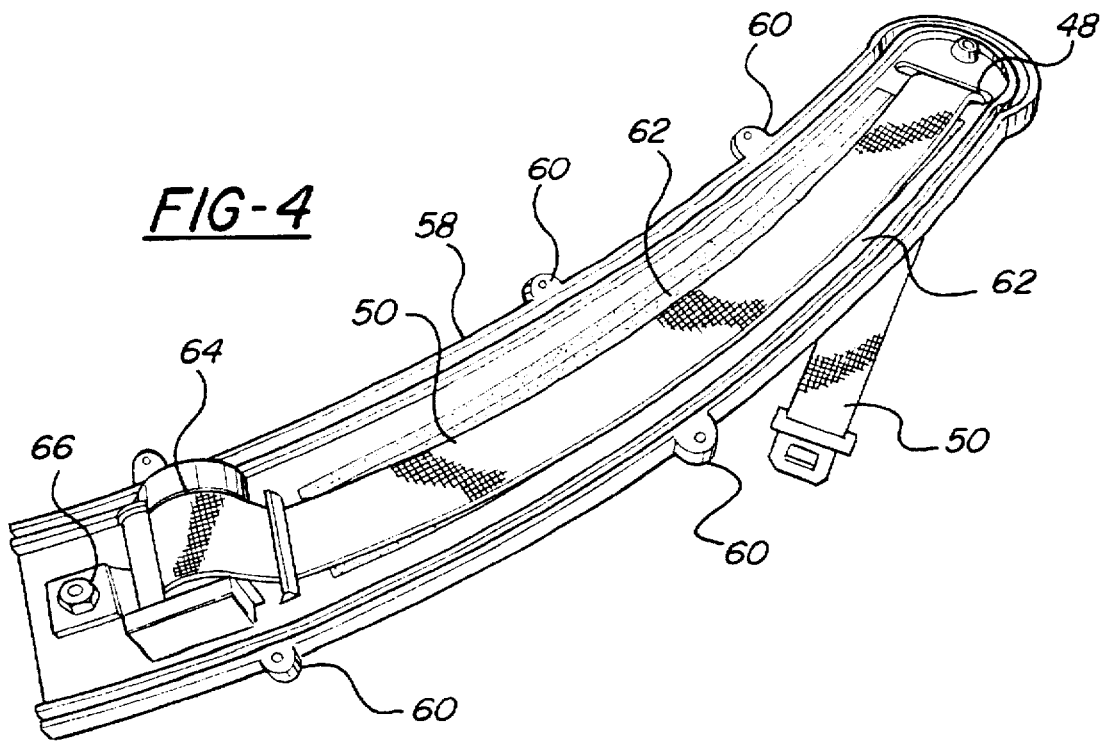
FIG. 4 is a perspective view of the cover of the shoulder belt housing and shoulder belt employed in the seat back of the subject invention.

The housing 44 includes a lower end disposed midway between the upright members 40 and curves upwardly and outwardly to the distal end 46 on one side of the seat back 34. As shown in FIGS. 3 and 4, the housing 44 includes a coffin portion defined by side walls 54 and a bottom 56 with the side walls 54 being integral with the truss elements 52 and the cross member 42. The housing 44 further comprises a cover 58 disposed over and in sealing engagement with the side walls 54. As shown, the cover 58 is disposed on a front face of the seat back 34 but the positions of the cover 58 and the bottom 56 may be reversed so that the cover 58 faces the rear seat assembly 14. The cover 58 includes lateral tabs 60 for receiving screws which threadedly engage holes in the truss elements 52 or bosses to secure the cover 58 over the side walls 54 of the coffin portion. The cover 58 is rotated 180° from the position shown in FIG. 4 to the position shown in FIG. 3.

The cover 58 of the housing 44 includes a guideway 62 for the shoulder belt 50. The opening 48 is elongated along an axis disposed at an acute angle to the upper cross member 42 for accommodating a diagonal extension of a shoulder belt 50 over a shoulder of an occupant. To accommodate the angled exit of the seat belt 50 from the opening 48, the guideway 62 has a compound curve to prevent the edges of a shoulder belt 50 from gathering in the extension thereof from the lower end of the guideway 62 and through the curved guideway 62 to the opening 48. In other words, the compound curve is analogous to a banked or ramped race track.

The upright members 40, the cross member 42, the truss elements 52, and the side walls 54 are all rectangular in cross section with the major axes thereof extending from front to back of the seat back 34, i.e., they are plate-like with their edges facing the front and rear of the seat back 34. The major axis of the rectangular cross section of the truss members 52 is less than the major axis of the rectangular cross section of the upright members 40, i.e., the truss members 52 are recessed below the outward edges of the upright members 40.

The shoulder belt 50 disposed in the housing includes a reel 64 for coiling and uncoiling the shoulder belt 50. The reel 64 is attached to the cover 58 by a bracket and bolt assembly 66.

A trim component 68 is disposed over the seat back 34, the component 68 having an opening 70 therein and the distal end 46 of the housing 44 extends through the opening 70. The component 68 encompasses the entire seat back 34 but may cover only the front of the seat back 34. As illustrated, their are right and left hand seat backs 34, but to reduce components the seat backs may be identicle with the distal ends 46 being on the same side in both of the front seats.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. An automotive seat back assembly comprising;

a pair of spaced upright members each having lower ends and upper ends, a mounting member at said lower ends for mounting said upright members to a seat frame, a cross member extending between said upper ends of said upright members, a shoulder belt housing having a lower end disposed between said upright members and curving upwardly and outwardly along a predetermined arcuate path from said lower ends of said upright members below said cross member to a distal end disposed above said cross member.

2. An assembly as set forth in claim 1 wherein said shoulder belt housing includes a guideway for guiding a shoulder belt, said guideway having a compound curve to prevent the edges of said shoulder belt from gathering along said arcuate path of said housing.

3. An assembly as set forth in claim 2 wherein said compound curve is a banked or ramped surface extending along the curved guideway.

4. An assembly as set forth in claim 2 wherein said shoulder belt housing defines a belt opening disposed above one of said upright members for positioning said shoulder belt over the shoulder of an occupant.

5. An assembly as set forth in claim 4 wherein said belt opening is elongated along an axis disposed at an acute angle to the upper cross member for accommodating a diagonal extension of said shoulder belt over the shoulder of the occupant.

6. An assembly as set forth in claim 4 including truss elements interconnecting said upright members and said housing.

7. An assembly as set forth in claim 6 wherein said upright and said cross members and said truss elements and said housing are integrally formed of a homogeneous material.

8. An assembly as set forth in claim 6 wherein said housing includes a coffin portion integral with said truss elements and said cross member, said coffin portion having side walls and a bottom, said housing further including a removable cover disposed over said side walls.

9. An assembly as set forth in claim 8 wherein said upright and said cross members and said truss elements are rectangular in cross section with the major axes thereof extending from front to back of said seat back.

10. An assembly as set forth in claim 9 wherein said major axis of said rectangular cross section of said truss elements is less than said major axis of said rectangular cross section of said upright members.

11. An assembly as set forth in claim 4 wherein said shoulder belt includes a reel for coiling and uncoiling said shoulder belt.

12. An assembly as set forth in claim 4 including a trim component disposed over said seat back assembly, said component having an opening therein and said distal end of said housing extending through said opening.

13. An automotive seat back assembly comprising;
- a pair of spaced upright members each having lower ends and upper ends,
- a mounting member at said lower ends for mounting said upright members to a seat frame,
- a cross member extending between said upper ends of said upright members,
- a shoulder belt housing having a lower end disposed between said upright members and curving upwardly and outwardly along a predetermined arcuate path from said lower ends of said upright members below said cross member to a distal end disposed above said cross member,
- said shoulder belt housing including a guideway for guiding a shoulder belt, said guideway having a compound curve forming a ramped surface to prevent the edges of said shoulder belt from gathering along said arcuate path of said housing.

* * * * *